US009153083B2

(12) United States Patent
Radicella et al.

(10) Patent No.: US 9,153,083 B2
(45) Date of Patent: Oct. 6, 2015

(54) SYSTEM AND METHOD FOR INTEGRATING AND ADAPTING SECURITY CONTROL SYSTEMS

(71) Applicant: ISONAS, INC., Boulder, CO (US)

(72) Inventors: Michael Radicella, Erie, CO (US); Richard Burkley, Boulder, CO (US); Kriston Chapman, Lyons, CO (US); Shirl Jones, Lyons, CO (US); Roger Matsumoto, Superior, CO (US)

(73) Assignee: ISONAS, INC., Boulder, CO (US)

( * ) Notice: Subject to any disclaimer, the term of this patent is extended or adjusted under 35 U.S.C. 154(b) by 0 days.

(21) Appl. No.: 14/019,924

(22) Filed: Sep. 6, 2013

(65) Prior Publication Data

US 2014/0070003 A1 Mar. 13, 2014

Related U.S. Application Data

(63) Continuation-in-part of application No. 12/833,890, filed on Jul. 9, 2010, now Pat. No. 8,662,386.

(60) Provisional application No. 61/698,247, filed on Sep. 7, 2012.

(51) Int. Cl.
*G06K 5/00* (2006.01)
*G07C 9/00* (2006.01)

(52) U.S. Cl.
CPC ........ *G07C 9/00111* (2013.01); *G07C 9/00087* (2013.01)

(58) Field of Classification Search
USPC .......................................................... 235/380
See application file for complete search history.

(56) References Cited

U.S. PATENT DOCUMENTS 4,816,658 A * 3/1989 Khandwala et al. .......... 235/382
4,839,640 A 6/1989 DeSantis et al.

(Continued)

FOREIGN PATENT DOCUMENTS

WO 0223367 A1 3/2002

OTHER PUBLICATIONS

HID, "HID Global Announces the Edge Family of IP-Based Access Control Solutions", "Webpage found at www.hidglobal.com/press-releases/hid-global-announces-edgetm-family-ip-based-access-control-solutions downloaded on Oct. 21, 2013", Mar. 28, 2007, p. 1 Publisher: HID Global, Published in: US.

(Continued)

*Primary Examiner* — Michael G Lee
*Assistant Examiner* — David Tardif
(74) *Attorney, Agent, or Firm* — Neugeboren O'Dowd PC

(57) ABSTRACT

A system for controlling access to one or more enclosed areas comprises at least one access card reader and controller powered via a Power-over-Ethernet (PoE) interface, each access card reader and controller being capable of controlling access through a particular entrance to a particular enclosed area and an access control server in communication with the at least one access card reader and controller, the access control server being capable of controlling the operation of the at least one access card reader and controller, and a signal converter disposed between the access card reader and the access control server. In a network mode of operation, the access control server is configured to perform authentication of a card identifier (ID) received from the at least one access card reader and controller and to signal the at least one access card reader and controller to unlock a door at the particular entrance to the particular enclosed area when the access control server has successfully authenticated the received card ID. In a standalone mode of operation, the at least one access card reader and controller is configured to perform local authentication of a received card ID independently of the access control server and to unlock a door at the particular entrance to the particular enclosed area when the at least one access card reader and controller has successfully authenticated the received card ID.

18 Claims, 10 Drawing Sheets

(56) References Cited

U.S. PATENT DOCUMENTS

| | | | |
|---|---|---|---|
| 5,060,066 | A | 10/1991 | Roberts |
| 5,070,442 | A | 12/1991 | Syron-Townson et al. |
| 5,226,160 | A | 7/1993 | Corcoran et al. |
| 5,376,948 | A | 12/1994 | Roberts |
| D371,765 | S | 7/1996 | Chastain et al. |
| 5,764,138 | A | 6/1998 | Lowe |
| 5,832,090 | A | 11/1998 | Raspotnik |
| 5,864,580 | A | 1/1999 | Lowe et al. |
| 5,898,241 | A | 4/1999 | Ganerillas |
| 5,908,103 | A | 6/1999 | Dlugos |
| 5,952,935 | A | 9/1999 | Griffiths et al. |
| 6,188,141 | B1 | 2/2001 | Daviaud |
| 6,191,687 | B1 | 2/2001 | Dlugos et al. |
| 6,192,282 | B1 | 2/2001 | Smith et al. |
| 6,223,984 | B1 | 5/2001 | Renner et al. |
| 6,229,300 | B1 | 5/2001 | Dlugos |
| 6,233,588 | B1 | 5/2001 | Marchoili et al. |
| D445,234 | S | 7/2001 | Isaacs et al. |
| D446,011 | S | 8/2001 | Ogilvie et al. |
| 6,344,796 | B1 | 2/2002 | Ogilvie et al. |
| 6,370,582 | B1 | 4/2002 | Lim et al. |
| 6,404,337 | B1 | 6/2002 | Till et al. |
| D460,262 | S | 7/2002 | Isaacs et al. |
| D460,621 | S | 7/2002 | Isaacs et al. |
| 6,476,708 | B1 | 11/2002 | Johnson |
| 6,566,997 | B1 | 5/2003 | Bradin |
| 6,581,161 | B1 | 6/2003 | Byford |
| 6,650,227 | B1 | 11/2003 | Bradin |
| 6,675,203 | B1 | 1/2004 | Herrod et al. |
| 6,738,772 | B2 | 5/2004 | Regelski et al. |
| 6,970,183 | B1 | 11/2005 | Monroe |
| 6,981,016 | B1 | 12/2005 | Ryan |
| 7,124,942 | B2 | 10/2006 | Steffen |
| 7,146,403 | B2 | 12/2006 | Tock et al. |
| 7,228,429 | B2 | 6/2007 | Monroe |
| 7,260,090 | B2 | 8/2007 | Buswell et al. |
| 7,305,560 | B2 | 12/2007 | Giobbi et al. |
| 7,323,991 | B1 | 1/2008 | Eckert et al. |
| 7,337,963 | B2 | 3/2008 | Harper et al. |
| 7,380,279 | B2 | 5/2008 | Prokupets et al. |
| 7,404,088 | B2 | 7/2008 | Giobbi |
| 7,407,110 | B2 | 8/2008 | Davis et al. |
| 7,439,862 | B2 | 10/2008 | Quan |
| 7,472,280 | B2 | 12/2008 | Giobbi |
| 7,475,812 | B1 | 1/2009 | Novozhenets et al. |
| 7,543,156 | B2 | 6/2009 | Campisi |
| 7,552,467 | B2 | 6/2009 | Lindsay |
| 7,617,970 | B2 | 11/2009 | Carr |
| 7,661,600 | B2 | 2/2010 | Theodossiou et al. |
| 7,669,054 | B2 | 2/2010 | Fox |
| 7,669,765 | B2 | 3/2010 | Harper et al. |
| 7,694,887 | B2 | 4/2010 | Jones et al. |
| 7,706,778 | B2 | 4/2010 | Lowe |
| 7,707,625 | B2 | 4/2010 | Klinefelter |
| 7,717,632 | B2 | 5/2010 | Lien |
| 7,728,048 | B2 | 6/2010 | LaBrec |
| 7,744,001 | B2 | 6/2010 | LaBrec et al. |
| 7,744,002 | B2 | 6/2010 | Jones et al. |
| 7,751,647 | B2 | 7/2010 | Pikaz |
| 7,752,652 | B2 | 7/2010 | Prokupets et al. |
| 7,753,272 | B2 | 7/2010 | Harper et al. |
| 7,767,050 | B2 | 8/2010 | Meier et al. |
| 7,769,212 | B2 | 8/2010 | Hwang et al. |
| 7,775,429 | B2 | 8/2010 | Radicella et al. |
| 7,789,311 | B2 | 9/2010 | Jones et al. |
| 7,793,353 | B2 | 9/2010 | Klinefelter |
| 7,793,846 | B2 | 9/2010 | Jones |
| 7,798,413 | B2 | 9/2010 | Bi et al. |
| 7,804,982 | B2 | 9/2010 | Howard et al. |
| 7,807,254 | B2 | 10/2010 | Bi et al. |
| 7,815,124 | B2 | 10/2010 | Schneck et al. |
| 7,819,327 | B2 | 10/2010 | Jones |
| 7,823,792 | B2 | 11/2010 | Bi et al. |
| 7,824,029 | B2 | 11/2010 | Jones et al. |
| 7,833,937 | B2 | 11/2010 | Bi et al. |
| 7,859,417 | B2 | 12/2010 | Harper et al. |
| 7,866,559 | B2 | 1/2011 | Bi et al. |
| 7,878,505 | B2 | 2/2011 | Meier et al. |
| 7,883,003 | B2 | 2/2011 | Gobbi et al. |
| 7,904,718 | B2 | 3/2011 | Giobbi et al. |
| 7,922,407 | B2 | 4/2011 | Hoffman |
| 7,927,685 | B2 | 4/2011 | Labrec et al. |
| 7,938,333 | B2 | 5/2011 | Jones |
| 7,939,465 | B2 | 5/2011 | Bi et al. |
| 7,962,467 | B2 | 6/2011 | Howard et al. |
| 7,963,449 | B2 | 6/2011 | Jones et al. |
| 7,967,213 | B2 | 6/2011 | Michalk |
| 7,971,339 | B2 | 7/2011 | Finn |
| 7,980,596 | B2 | 7/2011 | LaBrec |
| 8,002,180 | B2 | 8/2011 | Harper et al. |
| 8,002,190 | B2 | 8/2011 | Bi et al. |
| 8,011,217 | B2 | 9/2011 | Marschalek et al. |
| 8,025,239 | B2 | 9/2011 | Labrec et al. |
| 8,033,477 | B2 | 10/2011 | Jones et al. |
| 8,036,152 | B2 | 10/2011 | Brown et al. |
| 8,062,735 | B2 | 11/2011 | Bi et al. |
| 8,083,152 | B2 | 12/2011 | Theodossiou |
| 8,087,772 | B2 | 1/2012 | Jones |
| 8,099,187 | B2 | 1/2012 | Nehowig et al. |
| 8,264,323 | B2 | 9/2012 | Chandler, Jr. |
| 8,322,608 | B2 | 12/2012 | Davis et al. |
| 2002/0046092 | A1 | 4/2002 | Ostroff |
| 2002/0087894 | A1 | 7/2002 | Foley et al. |
| 2003/0080865 | A1 | 5/2003 | Capowski et al. |
| 2003/0086591 | A1 | 5/2003 | Simon |
| 2004/0080401 | A1 | 4/2004 | Stanley et al. |
| 2004/0104811 | A1 | 6/2004 | Stewart et al. |
| 2004/0223450 | A1* | 11/2004 | Bridges et al. ................ 370/216 |
| 2005/0044431 | A1 | 2/2005 | Lang et al. |
| 2005/0247776 | A1 | 11/2005 | Harper et al. |
| 2006/0017556 | A1 | 1/2006 | Stewart et al. |
| 2006/0087421 | A1 | 4/2006 | Stewart et al. |
| 2006/0151990 | A1* | 7/2006 | Cowburn ........................ 283/82 |
| 2006/0288101 | A1 | 12/2006 | Mastrodonato |
| 2007/0001008 | A1 | 1/2007 | Steffen |
| 2007/0035381 | A1 | 2/2007 | Davis |
| 2007/0046424 | A1* | 3/2007 | Davis et al. .................... 340/5.8 |
| 2007/0137326 | A1 | 6/2007 | Mdeyerle |
| 2007/0159301 | A1 | 7/2007 | Hirt et al. |
| 2007/0159304 | A1* | 7/2007 | Agarwal et al. ............ 340/10.32 |
| 2007/0159994 | A1 | 7/2007 | Brown et al. |
| 2007/0174809 | A1 | 7/2007 | Brown et al. |
| 2007/0193834 | A1 | 8/2007 | Pai et al. |
| 2007/0207750 | A1 | 9/2007 | Brown et al. |
| 2007/0245158 | A1* | 10/2007 | Giobbi et al. ................. 713/186 |
| 2007/0285511 | A1 | 12/2007 | Shafer et al. |
| 2008/0024271 | A1 | 1/2008 | Oberman et al. |
| 2008/0040609 | A1 | 2/2008 | Giobbi |
| 2008/0100416 | A1 | 5/2008 | Harper et al. |
| 2008/0164311 | A1 | 7/2008 | Harper et al. |
| 2008/0304111 | A1 | 12/2008 | Queenan et al. |
| 2009/0206992 | A1 | 8/2009 | Giobbi et al. |
| 2009/0254448 | A1 | 10/2009 | Giobbi |
| 2009/0291271 | A1 | 11/2009 | Michalk et al. |
| 2009/0323904 | A1 | 12/2009 | Shapiro et al. |
| 2010/0092030 | A1 | 4/2010 | Golan et al. |
| 2010/0201586 | A1 | 8/2010 | Michalk |
| 2010/0238030 | A1 | 9/2010 | Shafer et al. |
| 2011/0057040 | A1 | 3/2011 | Jones et al. |
| 2011/0057434 | A1 | 3/2011 | Bi et al. |
| 2011/0089676 | A1 | 4/2011 | Hecker et al. |
| 2011/0204141 | A1 | 8/2011 | Jones |
| 2011/0221568 | A1 | 9/2011 | Giobbi |
| 2011/0259964 | A1 | 10/2011 | Jones et al. |
| 2011/0266349 | A1 | 11/2011 | Bi et al. |

(56) References Cited

U.S. PATENT DOCUMENTS

2011/0286640 A1 11/2011 Kwon et al.
2011/0286686 A1 11/2011 Kwon et al.

OTHER PUBLICATIONS

HID, "HID Global's Edge Solo Wubs Product Acheivement Award at SIA New Product Showcase", "Webpage found at www.hidglobal.com/press-releases/hid-globals-edge-solo-wins-product-acheivement-award-sia-new-product-showcase downloaded on 10/21/20", Apr. 5, 2007, p. 1 Publisher: HID Global, Published in: US.
HID, "HID Globals' Edge Enhances eAXxess Security Management Software", "Webpage found at www.hidglobal.com/press-releases/hid-globals-edgetm-enhances-eaxxesstm-security-management-software downloaded on Oct. 21, 2013", Jul. 24, 2008, p. 1 Publisher: HID Global, Published in: US.
Axis, "Axis Enters the Physical Access Control Market", "Webpage found at www.axis.com/corporate/press/releases/viewstory.php?case_id=3097 downloaded on Oct. 21, 2013", Sep. 24, 2013, p. 3 Publisher: Axis Communications, Published in: US.
Axis, "White Paper: IP opens doors to a new world of physical access control", 2013, p. 6, Publisher: Axis Communications, Published in: US.
HID Global, "Edge—Deconstruction", p. 16, Published in: US.
HID Global, "Edge EVO EH400 Hi-O Networked Controller", 2012, p. 2, Published in: US.
HID Global, "Edge EVO EHR40-L Controller/Reader and Module", 2012, p. 2, Published in: US.
HID Global, "Edge Solo—Stand-Alone, single-door IP-based access control solution", p. 4, Published in: US.
HID Global Corporation, "EdgeReader and EdgePlus Installation Guide", p. 2, Published in: US.
HID Global, "Edge EVO EH400-K Networked Controller", 2012, p. 2, Published in: US.
HID Global, "Edge EVO EHRP40-K Controller/Reader and Module", 2012, p. 2, Published in: US.
HID Global, "Edge EVO Hi-O Interface Modules", 2012, p. 2, Published in: US.
HID Global, "OEM75 Users Manual", "iClass by HID", Dec. 18, 2008, p. 23, Publisher: HID Global Corporation, Published in: US.
Infinias, LLC, "The new Intelli-M Access Servers", Mar. 2010, p. 1, Published in: US.
Infinias, LLC, "For Immediate Release—infinias, LLC announces signing Security Equipment Supply as a Distributor for the Intelli-M Pro", Apr. 6, 2010, p. 1, Published in: US.
Infinias, LLC, "For Immediate Release—infinias, LLC announces Intelli-M Access, new web based access control software", Apr. 13, 2009, p. 1, Published in: US.
Infinias, LLC, "For Immediate Release—infinias, LLC announces the release of Intelli-M Access 3.0", Jun. 25, 2012, p. 2, Published in: US.
Infinias, LLC, "For Immediate Release—infinias, LLC announces the release of Intelli-M Access 2.3", Aug. 30, 2011, p. 1, Published in: US.
Infinias, LLC, "For Immediate Press Release—infinias, LLC announses availability of Intelli-M Access v1.1 Software", Sep. 18, 2009, p. 1, Published in: US.
Infinias, LLC, "For Immediate Release—infinias, LLC announces the release of Intelli-M Access Pro", Oct. 4, 2011, p. 1, Published in: US.
Infinias, LLC, "For Immediate Release—infinias, LLC announces availability of Intelli-M Access v1.2 Software", Nov. 23, 2009, p. 1, Published in: US.
Infinias, Inc., "True IP Access Control—The New Intelli-M Access SuiteSuite!","webpage found at www.infinias.com/main/Products/IntelliMAccess.aspx", 2012, p. 1, Published in: US.
Infinias, LLC, "Intelli-M eIDC—Ethernet-Enabled Integrated Door Controller", p. 2, Published in: US.
Infinias, Inc., "True IP Access Control—The Intelli-M eIDC", 2012, p. 1, Published in: US.
Infinias, LLC, "I/O Device", Jun. 15, 2012, p. 2, Published in: US.
Infinias, LLC, "The smallest, most powerful, highly scalable IP-based access control solution on the market", "Webpage found at www.infinias.com downloaded on Oct. 21, 2013", p. 16, Published in: US.
Integral Technologies, "Integral Technologies Introduces Intelli-M e-Series Power over Ethernet", "Webpage found at http://www.securityinfowatch.com/press_release/10577664/integral-technologies-introduces . . . downloaded on Oct. 18, 2013", Nov. 4, 2005, p. 2, Published in: US.
Integral Technologies, Inc., "Integral Technologies Debuts Intelli-M Integrated at ISC West", "Webpage found at www.prnewswire.com/news-releases/integral-technologies-debuts-intelli-m-integrated-at-isc-west-51639932.html downloaded on Oct. 21, 2013", Mar. 26, 2013, p. 2, Publisher: PR Newswire Association, LLC, Published in: US.
Isonas Security Systems, "Presenting Isonas Award-Winning ClearNet IP Reader-Controller!", p. 2, Published in: US.
Isonas Security Systems, "Isonas Award-Winning ClearNet IP Reader-Controller Is Now Wireless!", p. 2, Published in: US.
Isonas Security Systems, "Presenting the Isonas PowerNet IP Reader-Controller", p. 2, Published in: US.
Tardif, David P., "Office Action re U.S. Appl. No. 11/838,022", Jul. 9, 2009, p. 13, Published in: US.
Tardif, David P., "Office Action re U.S. Appl. No. 11/838,022", Nov. 9, 2009, p. 15, Published in: US.
Tardif, David P., "Office Action re U.S. Appl. No. 12/833,890", Sep. 25, 2013, p. 25, Published in: US.
Neugeboren, Craig A., "Response to Office Action re U.S. Appl. No. 12/833,890", Oct. 10, 2013, p. 10, Published in: US.
Helder Adao, et al., "Web-Based Control & Notification for Home Automation Alarm Systems", Jan. 25, 2008, p. 5, vol. 2, Publisher: World Academy of Science, Engineering and Technology.
C3 Communications, "The Utility's Role in the Future of PC Services and the NII: Final Report, DOE Contract No. DE F603", Jan. 1, 1998, p. 35 Publisher: Department of Energy, Published in: United States of America.
HID Global Corporation, "*HID Global Corporation* vs. *Isonas Inc.*, Memorandum", Feb. 3, 2014, p. 7 Publisher: Case No. SACV 13-01301, Published in: United States District Court, Central District of California.
HID Global Corporation, "*HID Global Corporation* vs. *Isonas Inc.*, Amended Complaint", Feb. 13, 2014, p. 11 Publisher: Case No. SACV14-00052, Published in: United States District Court—Central District of California.
HID Global Corporation, "*HID Global Corporation* vs. *Isonas Inc.*, Complaint", "Case No. SACV-13-01301", Aug. 23, 2013, p. 11, Published in: United States District Court, Central District of California.
HID Corporation, "*HID Global Corporation* vs. *Isonas Inc.*, Complaint", Jan. 13, 2014, p. 10 Published in: United States District Court, Central District of California.
Integral Technologies, "Intelli-M Access Control Solution—IDC Integrated Door Controller", 2005, p. 2 Publisher: http://www.security365iq.com/avcat/images/documents/dataSheet/IntelliM_IDC_Data%20Sheet.pdf, Published in: United States of America.
Pelco, Inc., "Software Installation and Reference", 2005, p. 244 Publisher: http://www.supercircuits.com/media/docs/s-base-kit-intelli-m-supervisor-plus-softwaremanual-in.pdf, Published in: United States of America.
Isonas Inc., "*HID Global Corp.* vs. *Isonas Inc.*, Answer", Feb. 19, 2014, p. 8 Publisher: Case No. SACV 13-01301, Published in: United States District Court, Central District of California.
Joseph R. Knisley, "The Basics of LonWorks", "Electrical Construction and Maintenance", Apr. 2004, p. 5.
Martin Patoka, "Power Over Ethernet Eases Design Implementations", "Power Electronics Technology", Nov. 2003, p. 4, Published in: United States of America.
Author Unknown, "IEEE802.3af Power Over Ethernet: A Radical New Technology", Jun. 2003, p. 10, Publisher: http://www.integral-networks.co.uk/downloads/whitepapers2/Power%20over%20Ethernet.pdf, Published in: United States of America.
Reza S. Raji, "Control Networks and the Internet, Revision 2.0", 1998, p. 13, Publisher: Echelon Corp.

* cited by examiner

SYSTEM AND METHOD FOR INTEGRATING AND ADAPTING SECURITY CONTROL SYSTEMS

PRIORITY AND RELATED APPLICATIONS

This application claims priority to U.S. Provisional Application No. 61/698,247 filed Sep. 7, 2012, the details of which are incorporated herein by reference in its entirety and for all proper purposes. This application is also a continuation in part of U.S. patent application Ser. No. 12/833,890 filed on Jul. 9, 2010, which in turn is a continuation of U.S. patent application Ser. No. 11/838,022, filed Aug. 13, 2007, now U.S. Pat. No. 7,775,429. The details of each of the above applications are incorporated herein by reference in their entirety and for all proper purposes.

FIELD OF THE INVENTION

The present invention relates generally to electronic security systems. In particular, but not by way of limitation, the present invention relates to methods and systems for controlling access to an enclosed area such as, without limitation, a building or a room within a building, a cabinet, a parking lot, a fenced-in region, or an elevator.

BACKGROUND OF THE INVENTION

Access control systems are commonly used to limit access to enclosed areas such as buildings, rooms within buildings, or fenced-in regions to only those people who have permission to enter. Conventional access control systems include access card readers at doors of the secured building. People who have permission to enter the building are provided an access control card that can be read by the access card readers. The card reader reads information from the card, and communicates the information to a control panel, which determines whether the door should be unlocked. If the door should be unlocked (i.e., the card is associated with a person who has permission to enter), the control panel then sends a signal to the locking mechanism of the door causing it to unlock. Conventional access control systems have several drawbacks and fail to take advantage of available modern technologies.

For example, in most conventional systems, radio frequency identification (RFID) is used for identification of the card to the access control system. The access card reader includes an RFID transceiver, and the access card includes an RFID tag or transponder. The RFID transceiver transmits a radio frequency query to the card as the card passes over it. The transponder includes a silicon chip and an antenna that enables the card to receive and respond to the RF query. The response is typically an RF signal that includes a pre-programmed identification (ID) number. The card reader receives the signal and transmits the ID number to the control panel via a wire connection. Conventional card readers are not very sophisticated. These card readers may perform some basic formatting of the identification data prior to sending it to the control panel, but are generally unable to perform higher level functions.

The control panel is typically mounted on a wall somewhere in the building. The control panel conventionally includes a bank of relays that are each controlled by a controller device. The controller device accesses memory to determine whether the identification number received from the card reader is recognized and valid. If so, the controller causes the associated relay to open (or close) to thereby send a signal to the door lock, which causes the lock to enter the unlocked state. The lock typically remains unlocked for a specified amount of time.

Conventional control panels have several drawbacks. For one, control panels consume a relatively large amount of space in relation to the number of doors they control. A control panel typically includes a specified number of relay banks, with each bank uniquely associated with the door it controls. For example, a control panel may have eight relay banks to control eight doors. Such a control panel could easily take up a 2 square foot area when mounted on a wall. If more than eight doors need to be controlled, then an additional control panel must be installed.

In addition, the "closed" architecture of conventional control panels make them inflexible, costly to maintain, and not user friendly. The closed architecture of the conventional control panels means that their design, functionality, specifications are not disclosed by the manufacturers or owners. In addition, control panel design is typically very complex, and specialized to a particular purpose, which renders them inaccessible by a typical building owner who has no specialized knowledge. As a result, when a control panel fails or needs to be upgraded, the building owner has no choice but to call a specialized technician to come onsite to perform maintenance or upgrading. The monetary cost of such a technician's services can be very high. In addition, a great deal of time could be wasted waiting for the technician to travel to the site. To solve the above mentioned problems and drawbacks, the inventions disclosed in U.S. Pat. No. 7,775,429 were developed. The details of U.S. Pat. No. 7,775,429 are incorporated into the present disclosure by reference in their entirety and for all proper purposes. It is upon these inventions that the present disclosure capitalizes and provides further improvement to existing systems.

SUMMARY OF THE INVENTION

In accordance with one aspect a system for controlling access to one or more enclosed areas comprises at least one access card reader and controller powered via a Power-over-Ethernet (PoE) interface, each access card reader and controller being capable of controlling access through a particular entrance to a particular enclosed area and an access control server in communication with the at least one access card reader and controller, the access control server being capable of controlling the operation of the at least one access card reader and controller, and a signal converter disposed between the access card reader and the access control server.

In accordance with other aspects, in a network mode of operation, the access control server is configured to perform authentication of a card identifier (ID) received from the at least one access card reader and controller and to signal the at least one access card reader and controller to unlock a door at the particular entrance to the particular enclosed area when the access control server has successfully authenticated the received card ID. In a standalone mode of operation, the at least one access card reader and controller is configured to perform local authentication of a received card ID independently of the access control server and to unlock a door at the particular entrance to the particular enclosed area when the at least one access card reader and controller has successfully authenticated the received card ID.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

Prior to describing one or more preferred embodiments of the present invention, definitions of some terms used throughout the description are presented.

DEFINITIONS

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may," "can," "could," or "might" be included or have a characteristic, that particular component or feature is not required to be included or have the characteristic.

The terms "responsive" and "in response to" includes completely or partially responsive.

The term "computer-readable medium" is a medium that is accessible by a computer and can include, without limitation, a computer storage medium and a communications medium. "Computer storage medium" generally refers to any type of computer-readable memory, such as, but not limited to, volatile, non-volatile, removable, or non-removable memory. "Communication medium" refers to a modulated signal carrying computer-readable data, such as, without limitation, program modules, instructions, or data structures.

Figure 1:
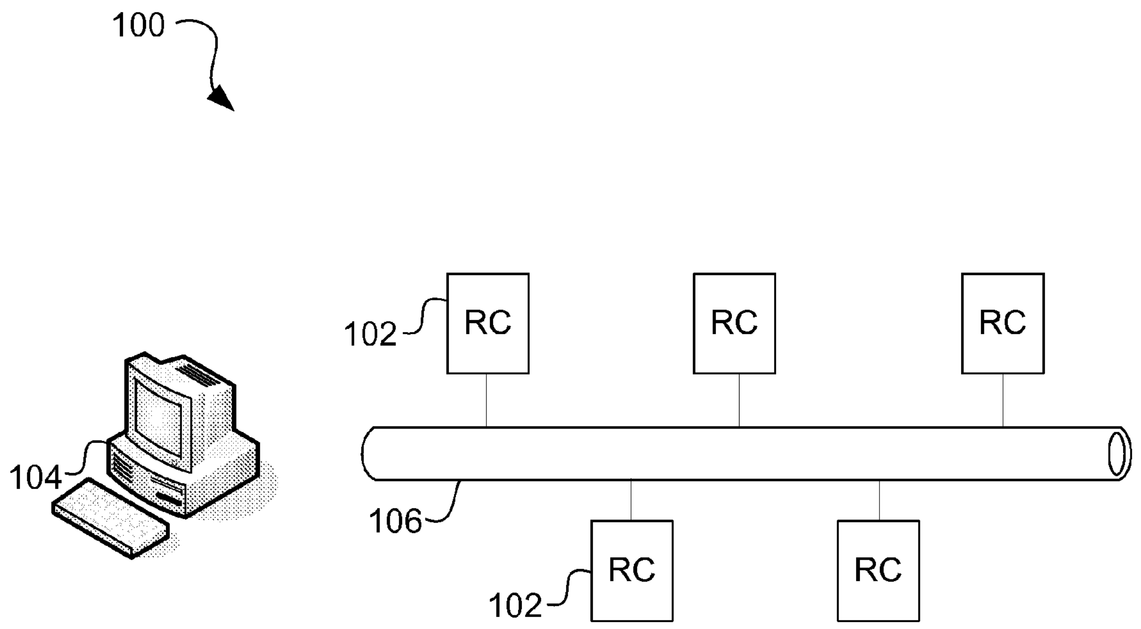
FIG. 1 schematic diagram illustrating primary components in an access control system in accordance with one embodiment with the present invention.

FIG. 1 schematic diagram illustrating primary components in an access control system 100 in accordance with one embodiment with the present invention. One or more access card reader/controllers 102 are in operable communication with a backend control system, such as an access control server 104, via a communication channel 106. Each of the access card reader/controllers 102 is associated with, and controls access through, a door (not shown). Herein, "door" is used in its broad sense to include, without limitation, an exterior door to a building, a door to a room within a building, a cabinet door, an elevator door, and a gate of a fence. Unlike conventional access card readers, the access card reader/controllers 102 each are operable to determine whether to unlock or lock the access card reader/controller's associated door. The access control server 104 is operable to perform management and configuration functions with respect to the access card reader/controllers 102.

The communication channel 106 may be either wired or wireless. In a wireless implementation, there is no need for a dedicated wire connection between each of the access card reader/controllers 102 and the access control server 104. As such, a wireless implementation can reduce implementation complexity and the number of points of potential failure that can exist in conventional systems. The wireless channel 106 can operate with a number of communication protocols, including, without limitation, transmission control protocol/Internet protocol (TCP/IP).

In some embodiments, access card readers operate in a synchronous mode, in which they are periodically polled by the primary access control device 104, and respond with their ID. Such polling can be an inefficient use of network bandwidth. Therefore, in accordance with various embodiments, the access control system 100 can operate in an asynchronous mode, as well as a synchronous mode. In the asynchronous mode, there is no need for the access control server 104 to periodically poll the access card reader/controllers 102. As such, network traffic is beneficially reduced in comparison to network traffic in a synchronous mode, in which polling is required. The asynchronous embodiment can also improve performance since events at the reader/controllers are reported immediately without waiting for the computer to poll for information.

In accordance with at least one embodiment, the system 100 implements programmable failure modes. As discussed further below, one of these modes is a network mode, in which the access control server 104 makes all decisions regarding locking and unlocking the doors; another mode is a standalone mode, in which each access card reader/controller 102 determines whether to unlock or lock a door, based on information in a memory local to the access card reader/controller 102.

In various embodiments, multiple access card reader/controllers 102 employ ZigBee functionality. In these embodiments, the access card reader/controllers 102 and the access control server 104 form a ZigBee mesh network. ZigBee functionality is discussed in more detail further below with reference to FIGS. 2-3.

Figure 2:
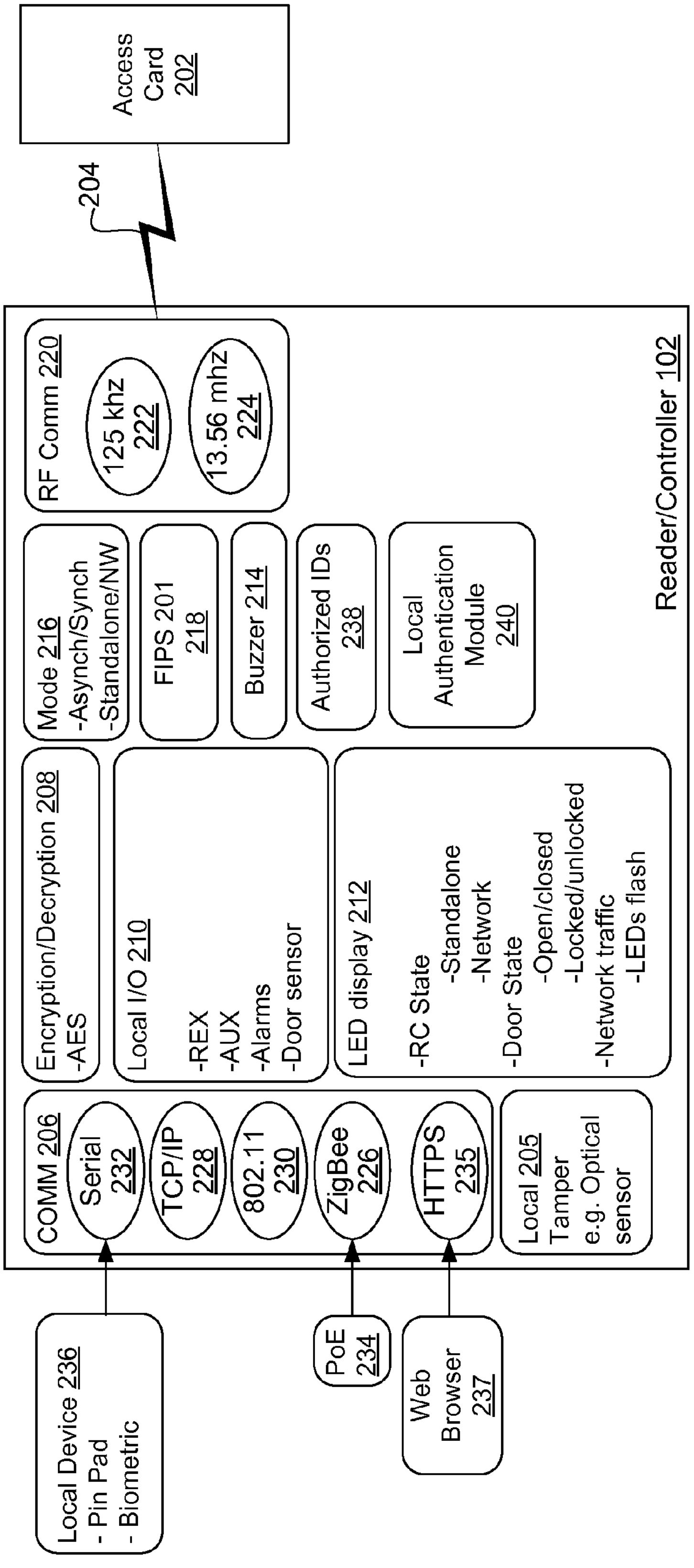
FIG. 2 is a functional block diagram illustrating functional modules that are included in a reader/controller in accordance with one embodiment.

FIG. 2 is a functional block diagram illustrating functional modules that are included in a reader/controller 102 in accordance with one embodiment. An access card 202 is shown emitting an RF signal 204 to the reader/controller 102. The RF signal 204 includes information including, but not limited to, identification (ID) information. Among other functions, the access card reader/controller 102 uses the RFID signal 204 to determine whether to unlock the door. The access card reader/controller 102 also performs other functions related to configuration, network communications, and others.

In this regard, the access card reader/controller 102 includes a number of modules including a local tamper detector 205, a device communication module 206, an encryption module 208, local input/output (I/O) 210, an LED display module 212, a buzzer module 214, a mode module 216, a federal information processing standard (FIPS) module 218, and an RF communication module 220.

In some embodiments, the access card reader/controller 102 reads RFID signal 204 at a single frequency—for example, a frequency of either 13.56 MHz or 125 kHz. In other embodiments, the reader/controller may include a dual reader configuration wherein the reader/controller can read at two frequencies, such as 125 kHz and 13.56 MHz. As such, in these embodiments, the RF communication module 220 includes a 125 kHz RF communication interface and a 13.56 MHz communication interface 224.

The local tamper detector 205 can detect when someone is attempting to tamper with the access card reader/controller 102 or with wires leading to or from the reader/controller 102, in order to try to override the control system and break in. In various embodiments, the local tamper detector 205 comprises an optical sensor. If such tampering is detected, the access card reader/controller sends a signal to the door locking mechanism that causes it to remain locked, despite the attempts to override the controller. For example, the optical tamper sensor 205 could send a signal to the local I/O module 210 to disable power to the door lock.

The device communication module 206 includes a number of modules such as a ZigBee module 226, a TCP/IP module 228, an IEEE 802.11 module 230, serial module 232, and HTTPS (secure Hypertext Transfer Protocol—HTTP) module 235. In some embodiments, communication module 206 supports both HTTP and HTTPS protocols. Each of the foregoing communication modules provides a different communication interface for communicating with devices in accordance with its corresponding protocol or format.

With regard to the ZigBee communication interface 226, a ZigBee protocol is provided. ZigBee is the name of a specification for a suite of high level communication protocols using small, low-power digital radios based on the IEEE 802.15.4 standard for wireless personal area networks (WPANs). ZigBee protocols generally require low data rates and low power consumption. ZigBee is particularly beneficial in an access control environment because ZigBee can be used to define a self-organizing mesh network.

In a ZigBee implementation, the access control server 104 acts as the ZigBee coordinator (ZC). One of the access card reader/controllers is the ZigBee end device (ZED). The other ZigBee access card reader/controllers are ZigBee routers (ZRs). The ZC, ZED, and ZRs form a mesh network of access card reader/controllers that are self-configuring. A ZigBee network is also scalable, such that the access card reader/controller network can be extended. In one embodiment, ZigBee is implemented in the access card reader/controller with a ZigBee chip.

The ZigBee interface 226 interfaces with Power-over-Ethernet (PoE) 234. PoE or "Active Ethernet" eliminates the need to run separate power cables to the access card reader/controller 102. Using PoE, system installers run a single CAT5 Ethernet cable that carries both power and data to each access card reader/controller 102. This allows greater flexibility in the locating of access points and reader/controllers 102, and significantly decreases installation costs in many cases. PoE 234 provides a power interface to the associated door locking mechanism, and also provides power to the components of the access card reader/controller 102. In other embodiments, a communication interface other than PoE that provides power without the need for separate power cables may be used to power the access card reader/controllers 102.

The IEEE 802.11 interface 230 provides communication over a network using the 802.11 wireless local area network (LAN) protocol. The TCP/IP interface 228 provides network communication using the TCP/IP protocol. The serial interface 232 provides a communication to other devices that can be connected locally to the access card reader/controller 102. As one example, a serial pin pad 236 could be directly connected to the reader/controller 102 through the serial interface 232. The serial interface 232 includes a serial chip for enabling serial communications with the reader/controller 102. As such, the serial interface 232 adds scalability to the reader/controller 102.

HTTPS module 235 allows reader/controller 102 to be configured via a Web-based user interface. HTTPS module 235 includes minimal but adequate server software or firmware for serving one or more Web pages to a Web browser 237 associated with a remote user. The remote user can configure the operation and features of reader/controller 102 via the one or more Web pages served to the Web browser 237.

The encryption/decryption module 208 provides for data security by encrypting network data using an encryption algorithm, such as the advanced encryption standard (AES). The encryption/decryption module 208 also decrypts data received from the network. As discussed further below, the access control server 104 also includes corresponding encryption/decryption functionality to facilitate secured network communication. Other forms of secure data transfer that may be implemented include wired equivalent privacy (WEP), Wi-Fi protected access (WPA), and/or 32 bit Rijndael encryption/decryption.

The local I/O module 210 manages input/output locally at the access card reader/controller 102. More specifically, the local I/O module 210 includes functionality to lock and unlock the door that is controlled by the access card reader/controller 102. In this respect, the local I/O module 210 receives as inputs an auxiliary signal, a request/exit signal, and a door sensor signal. The local I/O module 210 includes a door sensor to detect whether the door is closed or open. The local I/O module 210 includes (or controls) on board relays that unlock and lock the door. The local I/O module 210 can output one or more alarm signal(s). With regard to alarm signals, in one embodiment, two transistor-to-transistor logic (TTL) voltage level signals can be output to control alarms.

The light-emitting diode (LED) module 212 controls a display at the access card reader/controller 102. A number of indicators can be presented at the reader/controller 102 to indicate mode, door state, network traffic, and others. For example, the mode may be standalone or network. In network mode, the access control server 104 makes determinations as to whether to lock or unlock the door. In standalone mode, the local authentication module 240 of reader/controller 102 determines whether to lock or unlock the door using a set of authorized IDs 238 for comparison to the ID received in the signal 204. The LED display module 212 interacts with the mode module 216 for mode determination.

The LED display module 212 also interacts with the local I/O module 210 to determine the state of the door and displays the door state. Exemplary door states are open, closed, locked, and unlocked. LED lights can flash in various ways to indicate network traffic. For example, when the bottom LED is lit red, the reader/controller is in network mode and at a predefined interval set by the user, the top LED can flash an amber color to indicate the network is still active. The LED display module 212 interacts with the device communication module 206 to indicate network traffic level.

The mode module 216 determines and/or keeps track of the mode of operation. As discussed above, and further below, the access control system can operate in various modes, depending on the circumstances. In the illustrated embodiment, the four modes are asynchronous, synchronous, standalone, and network. It is possible to be in different combinations of these modes; i.e., to be in a hybrid mode. For example, it is possible to be in an asynchronous, standalone mode. It is also possible to be in either the asynchronous mode or synchronous mode, while in the network mode.

In the network mode, the access control server 104 makes all decisions as to whether to unlock and lock the doors for all reader/controllers 102. The reader/controllers 102 monitor the access control server 104. If the access control server 104 does not communicate for a specified time duration, the reader/controller 102 enters standalone mode. In standalone mode, the reader/controller 102 makes the decisions as to whether to unlock or lock the door based on the authorized IDs 238 stored at the reader/controller 102 independently of access control server 104.

In standalone mode, the reader/controller 102 broadcasts information. The information may include identification data, mode data, door state data, or other information. The information is broadcasted asynchronously. The system is operable to automatically recover from a situation in which the access control server 104 crashes. For example, while the reader/controllers 102 asynchronously broadcast, the server 104 may come back online and detect the transmissions from the reader/controllers. The server 104 can then resume data transmissions to re-enter the network mode. Of course, the system 100 can remain in the standalone mode.

In the network mode, the reader/controllers 102 may be synchronously polled by the server 104. The server 104 may send commands to the reader/controllers 102 to transmit specified, or predetermined data. This process serves a heartbeat function to maintain communication and security functionality among the reader/controllers 102 and the access control server 104.

The FIPS module 218 implements the FIPS standard. As such the system 100 and the individual reader/controllers 102 are in compliance with the FIPS standard, promulgated by the federal government. The FIPS standard generally specifies various aspects of the access card 202 layout and data format and storage. The FIPS module 218 supports access cards 202 that implement the FIPS standard and functions accordingly.

Figure 3:
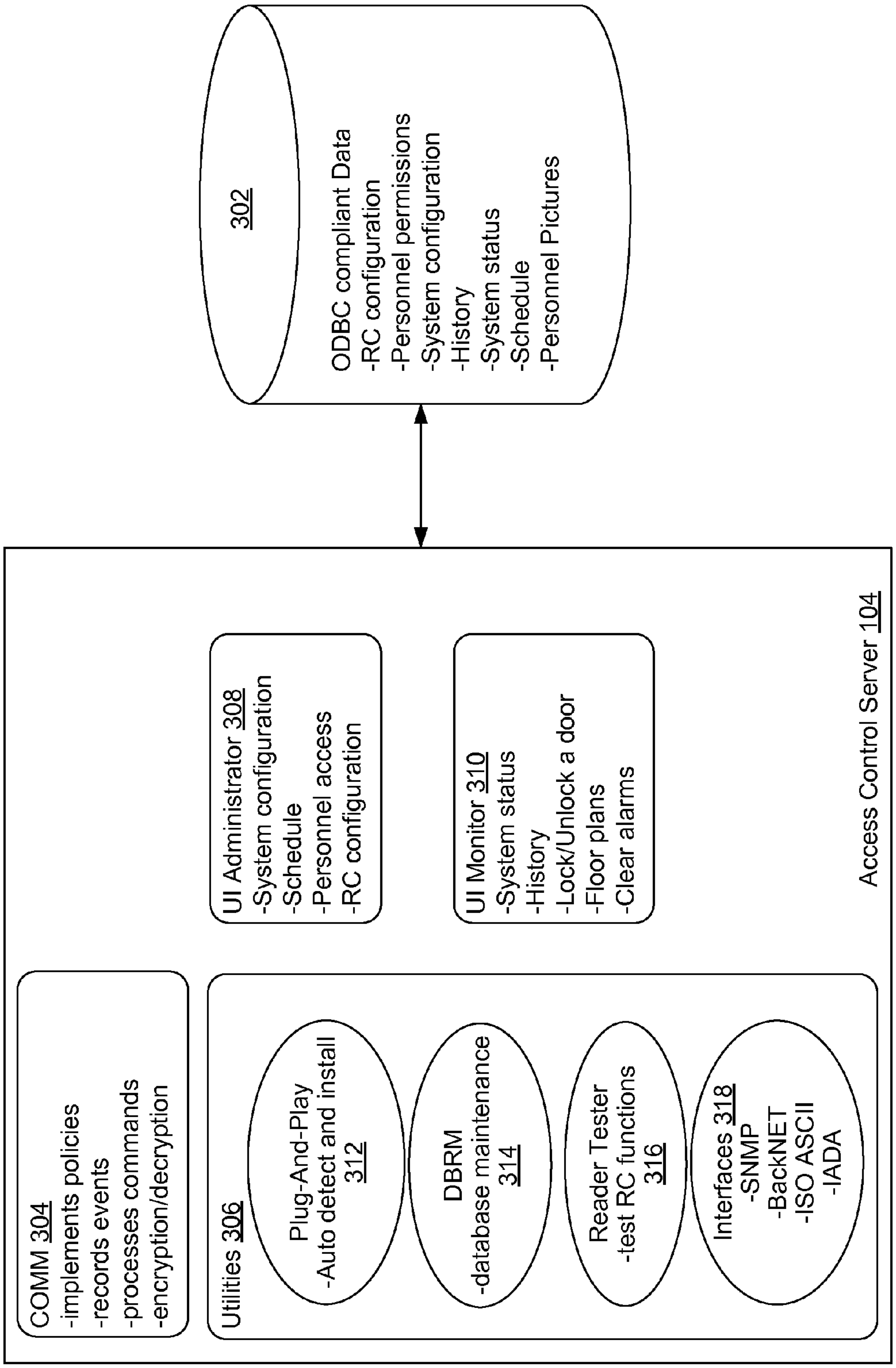
FIG. 3 is a functional block diagram illustrating functional modules that are included in an access control server in accordance with one embodiment.

FIG. 3 is a functional block diagram illustrating functional modules that are included in an access control server 104 and a database 302 in accordance with one embodiment. The server 104 includes a number of functional modules, such as a communication module 304, a utilities module 306, a user interface (UI) administrator 308, and a UI monitor 310. The database 302 stores various types of data that support functions related to access control.

More specifically, in this particular embodiment, the database 302 is open database connectivity (ODBC) compliant. The database 302 stores a number of types of data including, but not limited to, reader/controller configuration data, personnel permissions, system configuration data, history, system status, schedule data, and personnel pictures. The server 104 uses this data to manage the access control system 100.

The communication module 304 communicates with reader/controllers 102 using any of various types of communication protocols or standards (e.g., TCP/IP, 802.11, etc.). The communication module 304 implements policies that prescribe the manner in which access control communications or decision-making is to occur. For example, the communication module 304 may prescribe the order in which the different modes will be entered, depending on the circumstances.

The communication module 304 also records events that occur in the environment. Events may be the time and date of entry or leaving, the names of persons entering or leaving, whether and when a tampering incident was detected, whether and when standalone mode (or other modes) were entered, configuration or settings at the time of any of the events, and others. The communication module 304 also processes commands and responses to and from the reader/controllers 102. The communication module 304 performs network data encryption and decryption corresponding to that carried out by the reader/controllers 102.

The utilities module 306 includes a number of functional modules for implementing various features. For example, a plug-and-play utility 312 automatically detects addition of a new reader/controller 102 and performs functions to facilitate installation of the new reader/controller 102. Thus, the plug-and-play utility 312 may assign the new reader/controller 102 a unique network ID.

A database request module (DBRM) 314 performs database 302 management, which may include retrieving requested data from the database 302 or storing data in the database 302. As such, the DBRM 314 may implement a structured query language (SQL) interface.

A reader tester module 316 tests reader/controller functions. The reader tester 316 may periodically test reader/controllers 102, by querying them for certain information, or triggering certain events to determine if the reader/controllers 102 behave properly. The tester 316 may test the reader/controllers on an event-by-event basis, rather, or in addition to, a periodic basis.

An interface module 318 provides a number of communications interfaces. For example, a simple network management protocol may be provided, as well as a BackNET, International Standards Organization (ISO) ASCII interface, and an ISONAS Active DLL interface (ADI). Other interfaces or utilities may be included in addition to those shown in FIG. 3.

The UI administrator 308 can manage various aspects of the access control system 100, such as, but not limited to, system configuration, schedule, personnel access, and reader/controller configuration. The UI monitor 310 monitors the state of the access control system 100, and may responsively cause statuses to change. For example, the UI monitor 310 can monitor access control history, and floor plans, and may lock or unlock doors or clear alarms by sending the appropriate commands to the reader/testers 102.

Figure 4:
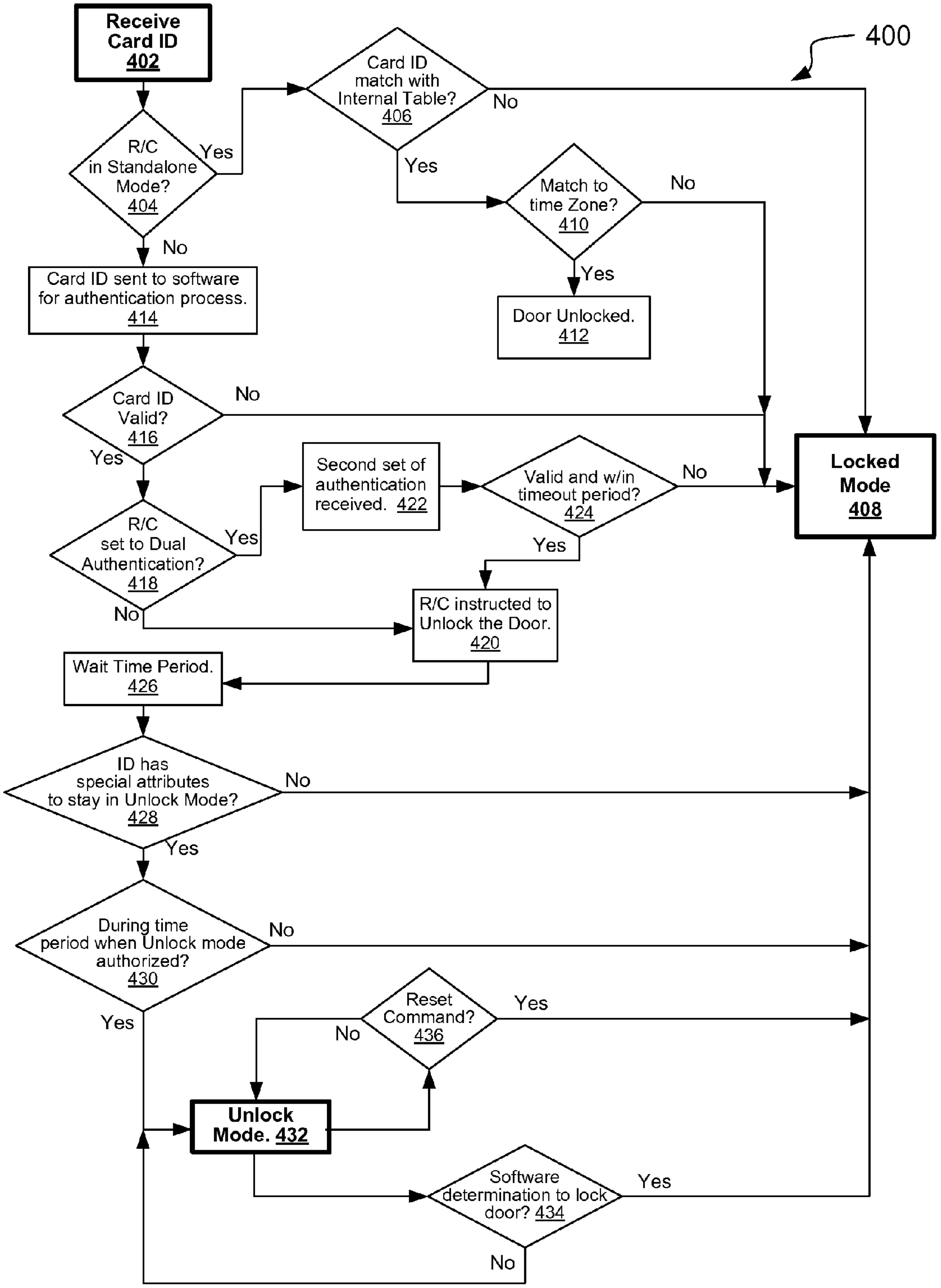
FIG. 4 is a flowchart illustrating an authentication and control algorithm that can be carried out by an access control system in accordance with an embodiment of the present invention.

FIG. 4 is a flowchart illustrating an access control algorithm 400 that authenticates individuals attempting to gain access through a locked door, which is controlled by an access control system in accordance with an embodiment of the present invention. Access control algorithm 400 is illustrative of an access control system algorithm, but the present invention is not limited to the particular order of operations shown in the FIG. 4. Operations in FIG. 4 may be rearranged, combined, and/or broken out as suitable for any particular implementation, without straying from the scope of the present invention.

As discussed above, the card reader of the access control system may enter in multiple modes, such as standalone mode, network mode, synchronous mode, and asynchronous mode. The modes can be relevant to the process by which the access control system authenticates a user and controls the state of the door. Prior to beginning the algorithm 400, it is assumed that a person has swiped an access control card, or a similar type of card, at the card reader of the access control system.

The access control algorithm 400, receives a card identifier (ID) at receiving operation 402. If the reader/controller is in standalone mode 404, then the card ID is authenticated against entries in one or more internal tables stored in the reader/controller. The internal tables include entries of "allowed" card IDs. The internal tables may be stored in RAM on the reader/controller. The internal table is scanned for an entry that matches the card ID 406. If there is no match, then the door will remain in Locked Mode 408.

If a matching entry is found, a determination is made whether the card ID is authorized to have access at this location (e.g., office, building, site, etc.) at the current time. The time that the card was read is compared with entries in a time zone table. In one embodiment, the time zone table include 32 separate time zones. If the card ID is found in the internal table 406 and if there is a match on the time zone 408, then a signal is sent to unlock the door 412.

In one embodiment of the present invention, the card ID is sent to a backend access control server that executes software for performing an authentication process 414. The authentication process 414 determines if the card ID is valid 416. Determining whether the card ID is valid can be done using card ID tables as was discussed above with respect to operation 406. If the authentication process determines that the card ID is valid, then the access control algorithm 400 determines if the reader/controller is set to dual authentication 418. If the reader/controller is not set to dual authentication then the reader/controller is instructed to unlock the door 420.

If the reader/controller is set to dual authentication, then two forms of identity need to be presented at a specific location. The first form of authentication may be the card presented to the reader/controller. The second form of authentication may be, but is not limited to, a PIN number entered on a pin pad or identification entered on a biometric device. When the access control algorithm 400 is set to dual authentication then the software delays response to the reader/controller so as to receive the second set of authentication 422. It is then determined if the second set of authentication is valid and received within a user-defined timeout period 424. If the second set of authentication is determined to be valid and is received prior to a user-defined timeout period, then the software sends the reader/controller a signal authorizing the door to be unlocked 420. If the second set of authentication is not valid or not received within the user-defined timeout period then no signal is sent to authorize the door to be unlocked and the door remains in the Locked Mode 408.

In one embodiment, a pin pad is integrated with (e.g., attached to) the housing of reader/controller 102. In another embodiment, the pin pad is separate from the housing of reader/controller 102 and is connected with communication module 206 via a wired or wireless communication link.

In one embodiment, after the reader/controller instructs the door to unlock 420, the door will remain unlocked for a second user-defined period 426. In one embodiment the card ID may have an attribute that will signal for the door to remain in unlock mode. The access control algorithm 400 determines if the card ID has the attribute to remain in unlock mode 428. If the card ID does not have the attribute, then after the second user-defined timed period the door will return to Locked Mode 408. If the card ID does have the attribute that will signal the door to remain in unlock mode, then it is determined if the card ID was presented during a time period for which the unlock mode is authorized 430. If the card ID was not presented during a time period for which the unlock mode is authorized, then the door will return to Locked Mode 408. However, the door will remain in Unlock Mode 432 if the card was presented during a time period for which the unlock mode is authorized.

In one embodiment, the Unlock Mode 432 may have been set by the card ID discussed above. The Unlock Mode 432 may also be, for example, but without limitation, sent from an unlock command originating from the software.

In one embodiment, the door will remain in the Unlock Mode 432 until such a time that the software determines is time to lock the door 434. At that software-determined time, the door will return to Locked Mode 408.

In one embodiment, at the end of every defined shift for which a reader/controller is authorized to accept cards, the software will send out a reset command to the reader/controller 436 if the current state of the reader/controller is in Unlock Mode. If a reset command is sent, the reader/controller will return to the Locked Mode 408.

Figure 5:
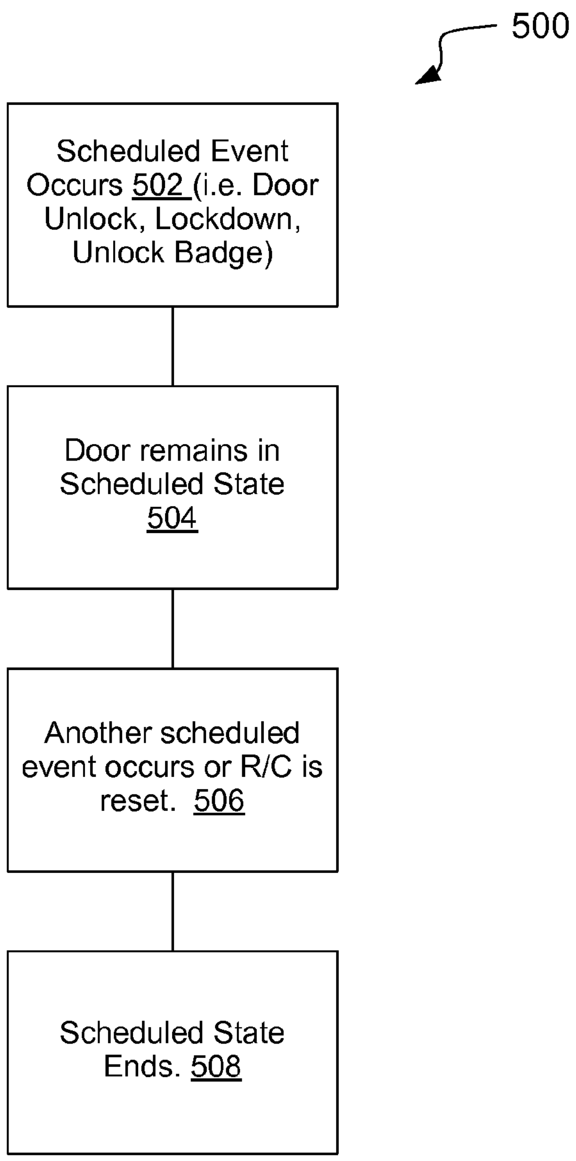
FIG. 5 is a flowchart illustrating a preconfigured event driven access control algorithm in accordance with one embodiment.

FIG. 5 is a flowchart illustrating one embodiment of a preconfigured event-driven access control algorithm 500. The software may be configured to perform a scheduled event at the reader/controller on a specific date and time 502. In one embodiment there are three types of events that are scheduled: (1) a door unlock event, (2) a lockdown event, and (3) an unlock badge event. Once one of the scheduled events has taken place, the reader/controller will cause the door to remain in the scheduled state 504 until either another scheduled event takes place or the reader/controller is reset to normal operations 506 at which point the scheduled state ends 508.

In one embodiment the door unlock event will cause the reader/controller to go into unlock mode, meaning the associated relay will be active and the two LEDS will be green.

In one embodiment the lockdown event will cause the door to lock and stay locked regardless of any cards presented to the reader/controller. When the reader/controller is in the lockdown state, the two LEDS will be red.

In one embodiment the unlock badge event will cause the reader/controller to operate normally until the next valid badge is presented, at which time the reader/controller will go into unlock mode.

Figure 6:
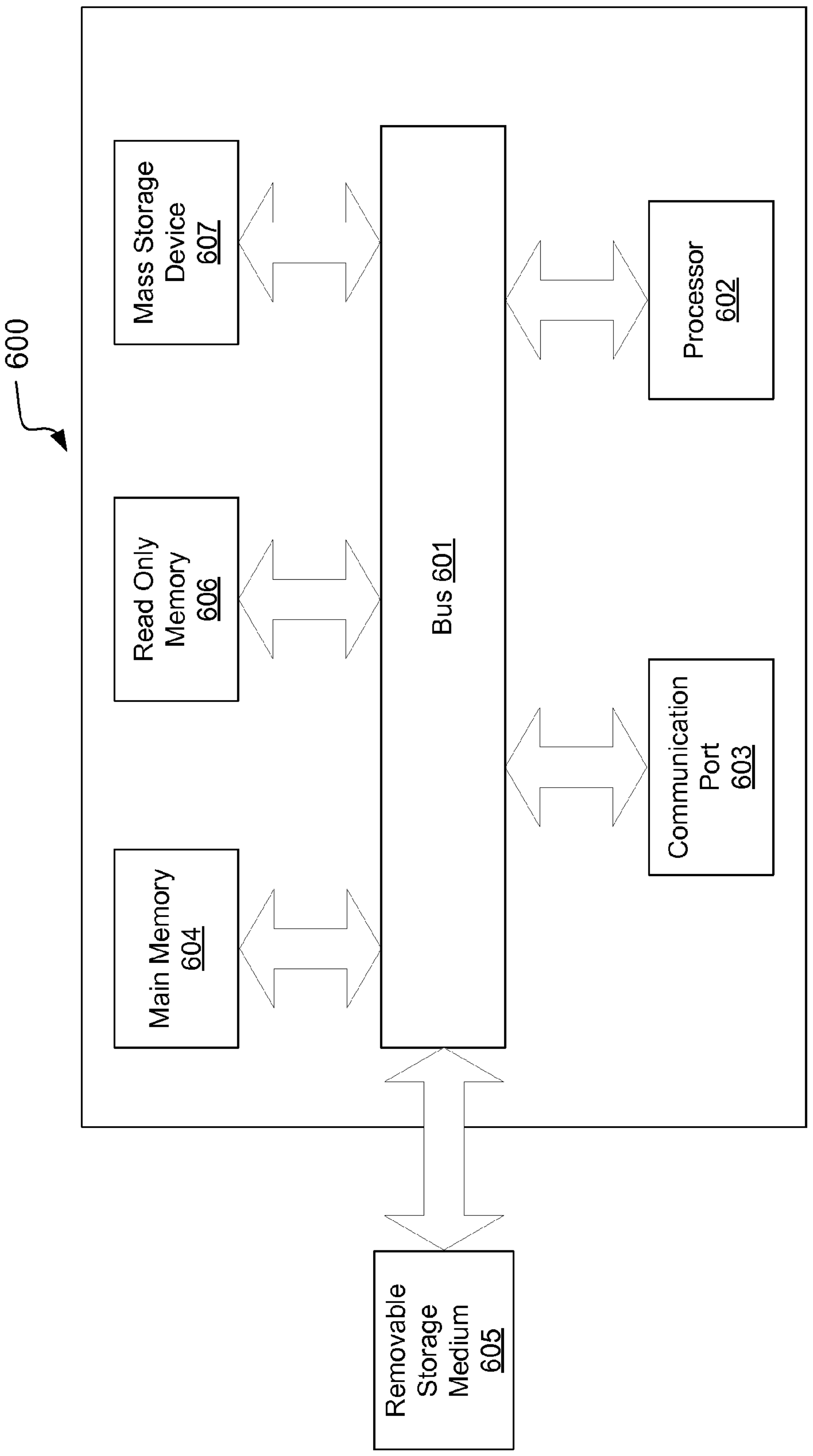
FIGS. 6 and 6B are schematic diagrams of a computing device upon which embodiments of the present invention may be implemented and carried out.

FIG. 6 is a schematic diagram of a computing device upon which embodiments of the present invention may be implemented and carried out. The components of computing device 600 are illustrative of components that an access control server and/or a reader/controller may include. However, any particular computing device may or may not have all of the components illustrated. In addition, any given computing device may have more components than those illustrated.

As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 600 includes a bus 601, at least one processor 602, at least one communication port 603, a main memory 604, a removable storage medium 605 a read only memory 606, and a mass storage 607. Processor(s) 602 can be any known processor such as, without limitation, an INTEL ITANIUM or ITANIUM 2 processor(s), AMD OPTERON or ATHLON MP processor(s), or MOTOROLA lines of processors. Communication port(s) 603 can be any of an RS-232 port for use with a serial connection, a 10/100 Ethernet port, or a Gigabit port using copper or fiber. Communication port(s) 603 may be chosen depending on a network such a Local Area Network (LAN), Wide Area Network (WAN), or any network to which the computing device 600 connects. The computing device 600 may be in communication with peripheral devices (not shown) such as, but not limited to, printers, speakers, cameras, microphones, or scanners.

Main memory 604 can be Random Access Memory (RAM), or any other dynamic storage device(s) commonly known in the art. Read only memory 606 can be any static storage device(s) such as Programmable Read Only Memory (PROM) chips for storing static information such as instructions for processor 602. Mass storage 607 can be used to store information and instructions. For example, hard disks such as the Adaptec® family of SCSI drives, an optical disc, an array of disks such as RAID, such as the Adaptec family of RAID drives, or any other mass storage devices may be used.

Bus 601 communicatively couples processor(s) 602 with the other memory, storage and communication blocks. Bus 601 can be a PCI/PCI-X, SCSI, or USB based system bus (or other) depending on the storage devices used. Removable storage medium 605 can be, without limitation, any kind of external hard-drive, floppy drive, IOMEGA ZIP DRIVE, flash-memory-based drive, Compact Disc-Read Only Memory (CD-ROM), Compact Disc-Re-Writable (CD-RW), or Digital Video Disk-Read Only Memory (DVD-ROM). In some embodiments, the computing device 600 may include multiple removable storage media 605.

Figure 6B:
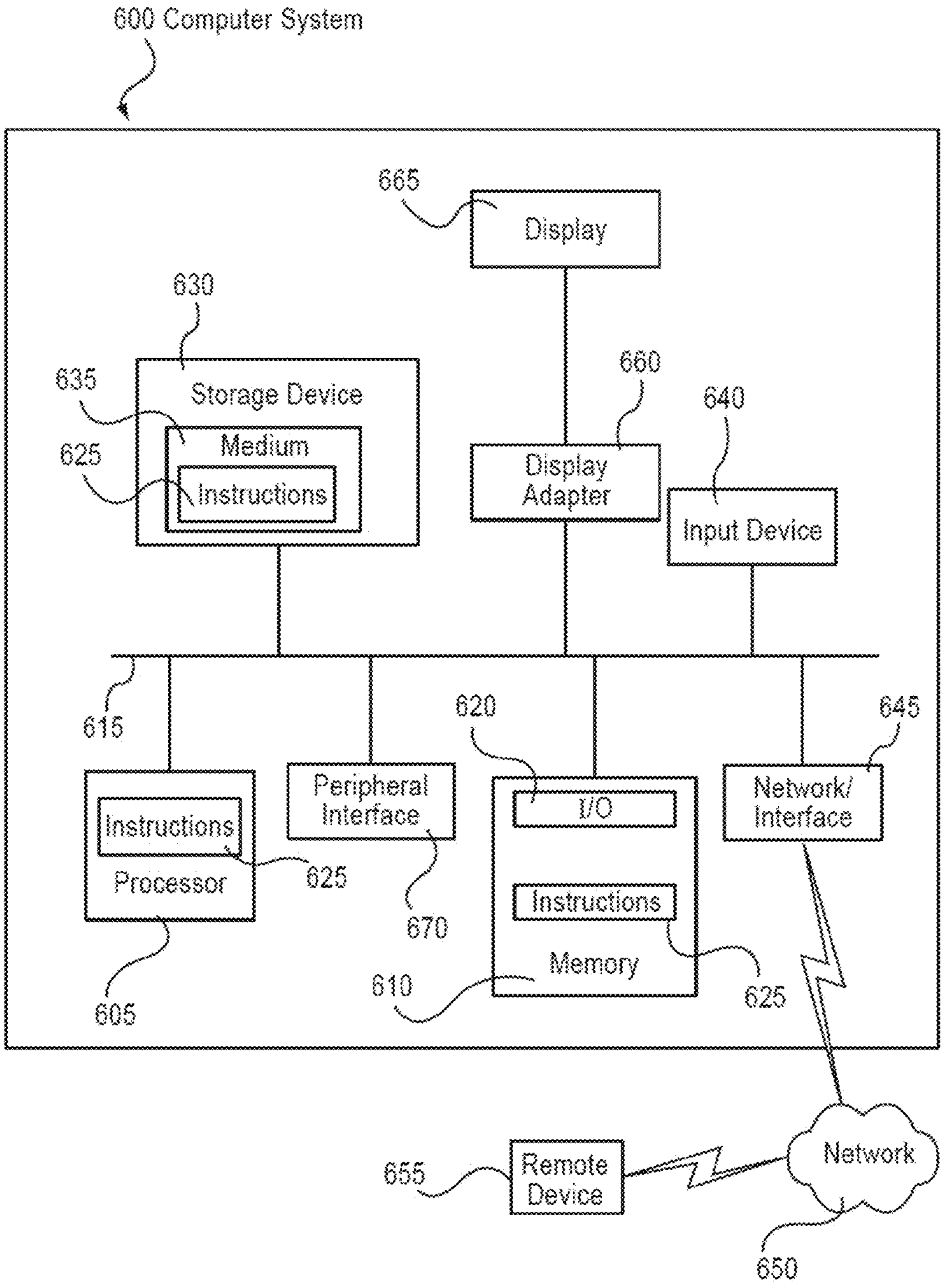

FIG. 6B below shows a diagrammatic representation of another embodiment of a machine in the exemplary form of a computer system 600 within which a set of instructions for causing a device to perform any one or more of the aspects and/or methodologies of the present disclosure to be executed.

In FIG. 6B, Computer system 600 includes a processor 605 and a memory 610 that communicate with each other, and with other components, via a bus 615. Bus 615 may include any of several types of bus structures including, but not limited to, a memory bus, a memory controller, a peripheral bus, a local bus, and any combinations thereof, using any of a variety of bus architectures.

Memory 610 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 620 (BIOS), including basic routines that help to transfer information between elements within computer system 600, such as during start-up, may be stored in memory 610. Memory 610 may also include (e.g., stored on one or more machine-readable media) instructions (e.g., software) 625 embodying any one or more of the aspects and/or methodologies of the present disclosure. In another example, memory 610 may further include any number of program modules including, but not limited to, an operating system, one or more application programs, other program modules, program data, and any combinations thereof.

Computer system 600 may also include a storage device 630. Examples of a storage device (e.g., storage device 630) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 630 may be connected to bus 615 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 630 may be removably interfaced with computer system 600 (e.g., via an external port connector (not shown)). Particularly, storage device 630 and an associated machine-readable medium 635 may provide nonvolatile and/or volatile storage of machine-readable instructions, data structures, program modules, and/or other data for computer system 600. In one example, software 625 may reside, completely or partially, within machine-readable medium 635. In another example, software 625 may reside, completely or partially, within processor 605. Computer system 600 may also include an input device 640. In one example, a user of computer system 600 may enter commands and/or other information into computer system 600 via input device 640. Examples of an input device 640 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 640 may be interfaced to bus 615 via any of a variety of interfaces (not shown) including, but not limited to, a serial interface, a parallel interface, a game port, a USB interface, a FIREWIRE interface, a direct interface to bus 615, and any combinations thereof.

A user may also input commands and/or other information to computer system 600 via storage device 630 (e.g., a removable disk drive, a flash drive, etc.) and/or a network interface device 645. A network interface device, such as network interface device 645 may be utilized for connecting computer system 600 to one or more of a variety of networks, such as network 650, and one or more remote devices 655 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 650, may employ a wired and/or a wireless mode of communication. In general, any network topology may be used. Information (e.g., data, software 625, etc.) may be communicated to and/or from computer system 600 via network interface device 645.

Computer system 600 may further include a video display adapter 660 for communicating a displayable image to a display device, such as display device 665. A display device may be utilized to display any number and/or variety of indicators related to pollution impact and/or pollution offset attributable to a consumer, as discussed above. Examples of a display device include, but are not limited to, a liquid crystal display (LCD), a cathode ray tube (CRT), a plasma display, and any combinations thereof. In addition to a display device, a computer system 600 may include one or more other peripheral output devices including, but not limited to, an audio speaker, a printer, and any combinations thereof. Such peripheral output devices may be connected to bus 615 via a peripheral interface 670. Examples of a peripheral interface include, but are not limited to, a serial port, a USB connection, a FIREWIRE connection, a parallel connection, and any combinations thereof. In one example an audio device may provide audio related to data of computer system 600 (e.g., data representing an indicator related to pollution impact and/or pollution offset attributable to a consumer).

A digitizer (not shown) and an accompanying stylus, if needed, may be included in order to digitally capture freehand input. A pen digitizer may be separately configured or coextensive with a display area of display device 665. Accordingly, a digitizer may be integrated with display device 665, or may exist as a separate device overlaying or otherwise appended to display device 665.

Integration with Existing Security Systems

Figure 8:
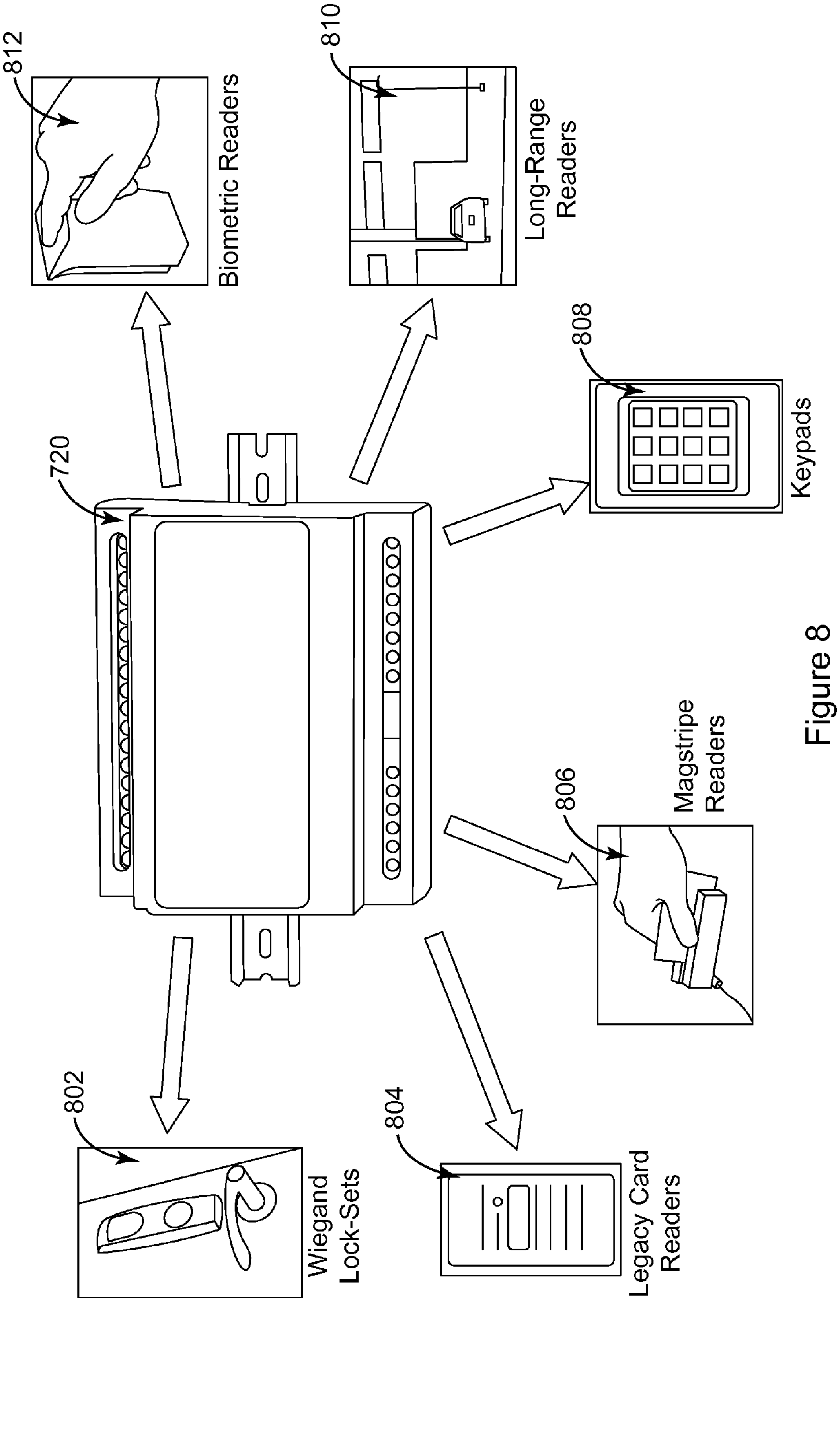
FIG. 8 is a schematic diagram of the signal converter of FIG. 7 as used in conjunction with other IP devices.
Figure 9:
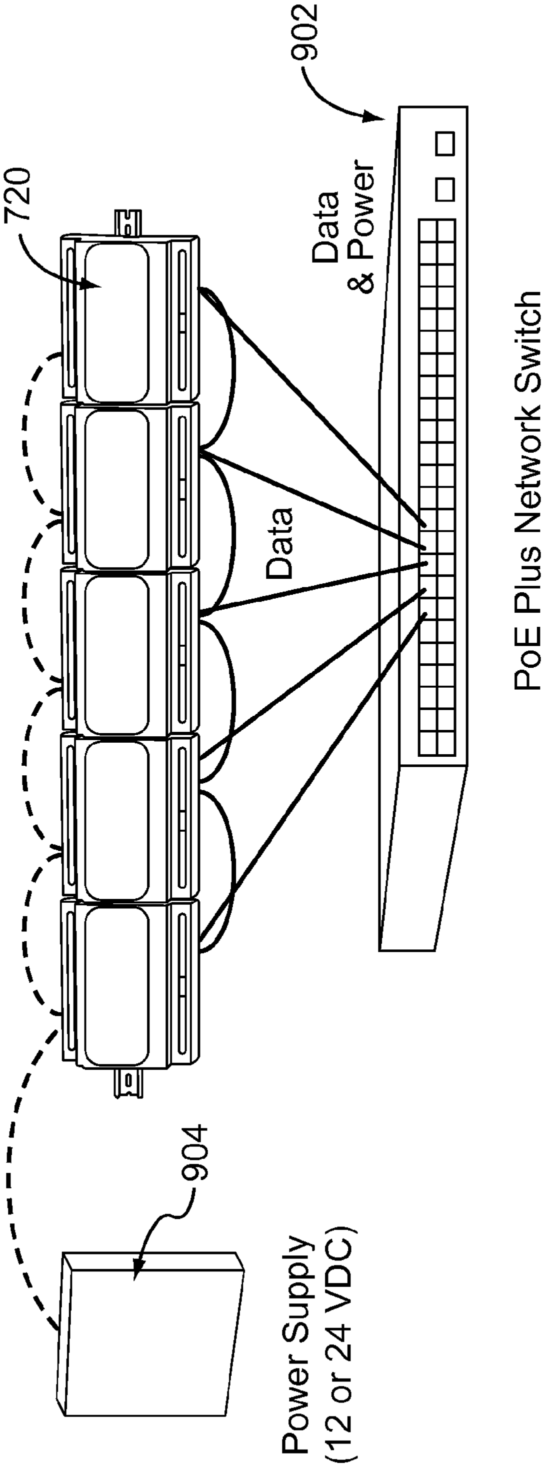
FIG. 9 is a schematic of the signal converter of FIG. 7 combined with an IP bridge and power supply.

In accordance with other aspects and improvements to the above, the following additional embodiments are described. While the previously described embodiments are well-suited for new installations and provide an environment for ease of expansion, it does not adequately address existing facilities that have legacy security and access control systems and where the facility operators do not want to replace or otherwise abandon the expensive and otherwise operable systems that are already in place. In accordance with this desire, another embodiment of an access control system is described that allows the takeover and integration of legacy systems into the security systems described herein by providing a signal conversion between new PoE access points and existing controllers located in utility spaces or other rack mounted systems. These embodiments make be useful for situations where the installer desires to take over legacy systems, to accommodate entry points that require larger amounts of power, to provide additional protection against vandalism of expensive equipment or protection from environmental conditions and to otherwise minimize costs relating the control of entry/exit points. Various embodiments in accordance with these aspects are described in FIGS. 7-9.

Figure 7:
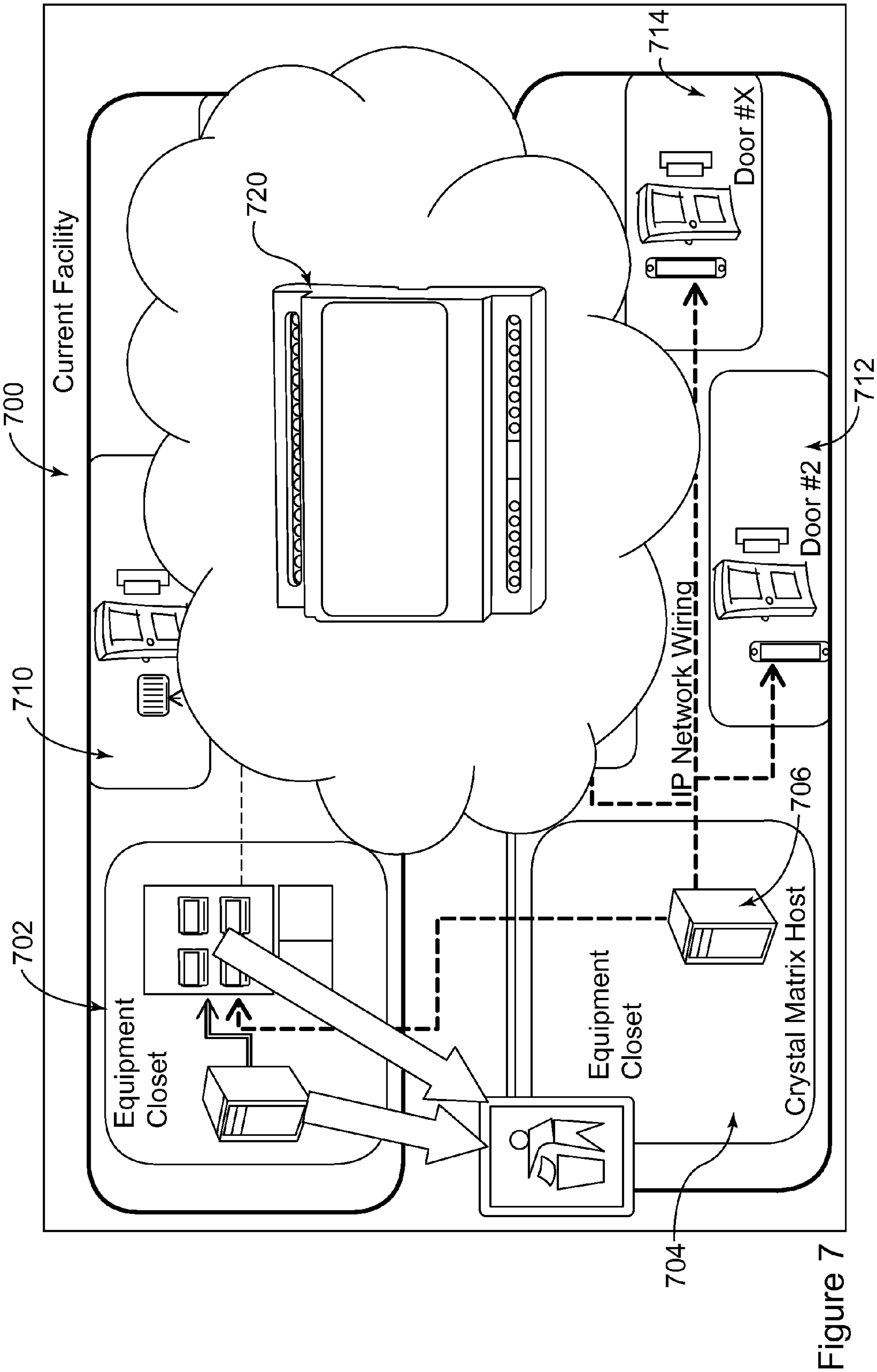
FIG. 7 is a schematic diagram showing the use of a signal converter to allow incorporation of aspects of the present invention into existing or legacy security systems.

For example, referring to FIG. 7 illustrates the general layout of an existing facility 700 that includes a service equipment closets 702 and 704 that may house existing security servers 706 and 708. A signal converter 720 (sometimes referred to as a duplex PowerNet) is provided that allows for integration and adaptation to existing facilities. Signal converter 720 provides the logic and control of two or more existing control modules, regardless of manufacturer, is enabled to control multiple access point, accepts Wiegand inputs and multiple power options and can be rail mounted within an existing rack mounting facility. Power options for signal converter 720 include PoE for the door equipment power as well as DC (12 VDC or 24 VDC) power supply for all components. Because of the agnostic nature of the signal converter 720, it can accommodate multiple devices such as Wiegand lock-sets 802, legacy card readers 804, magstripe readers 806, keypads 808, biometric readers 812, and long range readers 810 (See FIG. 8). IP network wiring can be utilized to supply power to door locations 710, 712 and 714 allowing for easy install but without the expense and installation hassle of replacing existing control panels and other utility equipment. For installations that require a larger number of entry points or controllers, signal converter 720 can be coupled together in combination with a PoE Network Switch 902 and power supply 904 to enable a similar installation (See FIG. 9).

Signal converters 720 also provide enhanced support for a single door install and can be daisy-chained together with other devices such as another signal converter, IP cameras, IP biometric readers and can allow PoE to be supplied to the other device.

Signal converter 720 enhances support for facilities such as data centers that utilize multiple data racks and can accommodate readers on both sides of the racks. Wireless locksets made by companies such as Assa Abloy or Aperio can also be accommodated with the signal converter 720.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. An access control system comprising:

a radio-frequency communication module configured to receive an identification signal including a credential identifier;

a mode module configured to determine an operational mode of the access control system, the operational modes including a standalone mode and a network mode;

a communication module configured to authenticate the credential identifier by transmitting the credential identifier, to an access control server when the access control system is determined to be operating in the network mode;

a local authentication module configured to authenticate the credential identifier against entries of one or more internal tables when the access control system is determined to be operating in the standalone mode; and a local input/output module configured to send a signal to a solid state relay to unlock a door at an entrance to the enclosed area when the credential identifier has been successfully authenticated;

wherein the communication module includes an interface to serve data that can be displayed to a user external to the access control system.

2. The access control system of claim 1, further comprising a signal converter coupled to the communication module that is agnostic to a communication protocol of the access control server.

3. The access control system of claim 2 wherein the signal converter is agnostic to a communication protocol of the local authentication module.

4. The access control system of claim 2 wherein the signal converter is adapted to interface with a plurality of access controllers.

5. The access control system of claim 1, wherein the communication module includes at least one of a serial interface, a TCP/IP interface, an IEEE 802.11 interface, an IEEE 802.15.4 interface, and a secure HTTP interface.

6. The access control system of claim 1, wherein the communication module is configured to transmit the credential identifier to the access control server via a wireless communication link.

7. The access control system of claim 1, wherein the radio-frequency communication module receives the identification signal from a radio-frequency identification (RFID) transponder included in an access control card.

8. The access control system of claim 1, wherein the operational modes include at least one of a synchronous mode and an asynchronous mode.

9. The access control system of claim 1, wherein data transmitted to the access control server is encrypted.

10. A system for controlling access to one or more enclosed areas, the system comprising:

at least one access controller powered via a Power-over-Ethernet (PoE) interface, the at least one access controller being capable of controlling access through a particular entrance to a particular enclosed area;

an access control server in communication with the at least one access controller, the access control server being capable of controlling the operation of the at least one access controller;

a signal converter disposed between the at least one access controller and the access control server, the signal converter including logic to administer a plurality of controllers having a plurality of preexisting communication protocols;

an interface to serve data that can be displayed to a user external to the access control system;

wherein, in a network mode of operation, the access control server is configured to perform authentication of a credential identifier received from the at least one access controller and to signal a solid state relay at the at least one access controller to unlock a door at the particular entrance to the particular enclosed area when the access control server has successfully authenticated the received credential identifier;

wherein, in a standalone mode of operation, the at least one access card controller is configured to perform local authentication of a received credential identifier independently of the access control server and to unlock a door at the particular entrance to the particular enclosed area when the at least one access controller has successfully authenticated the received credential identifier.

11. The system of claim 10, wherein the at least one access controller is configured to enter the standalone mode of operation automatically when the access control server fails.

12. The system of claim 11, wherein, after having automatically entered the standalone mode of operation in response to a failure of the access control server, the at least one access controller is configured to re-enter the network mode of operation automatically once the access control server has resumed normal operation.

13. The system of claim 10, wherein the access control server is configured to detect automatically that an access controller has been added to the system.

14. The system of claim 10, wherein the at least one access controller is capable of operating in at least one of a synchronous mode and an asynchronous mode.

15. The system of claim 10 wherein the signal converter is agnostic to a communication protocol of the access control server.

16. The system of claim 10 wherein the signal converter is agnostic to a communication protocol of the local authentication module.

17. A method for controlling access to an enclosed area, the method comprising:

receiving an identification signal including a credential identifier in an access controller associated with an entrance to the enclosed area, the access controller being powered via a Power-over-Ethernet (PoE) interface;

determining an operational mode of the access controller, the operational modes including a standalone mode and a network mode;

authenticating the credential identifier by transmitting the credential identifier to an access control server when the access controller is determined to be operating in the network mode;

authenticating the credential identifier against entries of one or more internal tables stored in the access controller when the access controller is determined to be operating in the standalone mode; and sending a signal to a solid state relay to unlock a door at the entrance to the enclosed area associated with the access controller when the credential identifier has been successfully authenticated; and serving data that can be displayed to a user external to the access control system.

18. The method of claim 17, wherein the credential identifier is transmitted to the access control server via a wireless communication link.

* * * * *